United States Patent [19]
Takahashi et al.

[11] Patent Number: 5,341,247
[45] Date of Patent: Aug. 23, 1994

[54] APPARATUS FOR RECORDING AND REPRODUCING A DIGITAL SIGNAL TO PERFORM A TRACK BOUNCING EDITING OPERATION

[75] Inventors: Hiroshi Takahashi; Seiji Tanizawa, both of Kanagawa, Japan

[73] Assignee: Sony Corporation, Tokyo, Japan

[21] Appl. No.: 5,111

[22] Filed: Jan. 15, 1993

[30] Foreign Application Priority Data

Jan. 18, 1992 [JP] Japan .................................. 4-027161

[51] Int. Cl.$^5$ ........................ G11B 27/02; G11B 15/12
[52] U.S. Cl. ......................................... 360/13; 360/63
[58] Field of Search ........................ 360/13, 31, 39, 53, 360/61, 63

[56] References Cited

U.S. PATENT DOCUMENTS 4,723,176  2/1988  Iue .......................................... 360/13
5,166,835 11/1992  Tanizawa .............................. 360/13

FOREIGN PATENT DOCUMENTS 0361315  4/1990  European Pat. Off. .

OTHER PUBLICATIONS

Patent Abstracts of Japan vol. 7, No. 245 (P-233)(1390) Oct. 29 1983 & JP-A-58 130 416 (Sony K. K.) Aug. 3 1983.
Patent Abstracts of Japan vol. 6, No. 30 (P-103) (908) Feb. 1982 & JP-A-56 148 775 (Mitsubishi Denki K. K.) Nov. 18 1981.
AES Reprint: 1677 (H-6), Presented at the 67th Convention, 1980, Oct.31/Nov. 3, New York, U S Oct. 1980, New York, U S pp. 1-11 Doi et al. 'A format Of Stationary-Head Digital Audio Recorder Covering Wide Range of Application' page 8 -page 9; figures 11, 12.
Patent Abstracts of Japan vol. 14, No. 274 (P-1061) Jun. 13 1990 & JP-A-02 079 262 (Sony Corp.) Mar. 19 1990.

*Primary Examiner*—Donald Hajec
*Assistant Examiner*—Won Tae C. Kim
*Attorney, Agent, or Firm*—William S. Frommer; Alvin Sinderbrand

[57] ABSTRACT

A recording and reproducing apparatus is to monitor the information to be recorded actually by the recording heads. The recording and reproducing apparatus comprises a digital mixer for inputting signals from the multiple preceding reproducing heads corresponding to the multiple recording tracks respectively and performing the prescribed signal processes and simultaneously outputting the signals inputted to the monitor speaker, and cross fader circuits for shifting signals from the digital mixer or the multiple preceding reproducing heads and outputting to the recording heads placed on the back of the preceding reproducing heads, and which is adapted to rewrite the information recorded on the first recording track of the recording medium to the second recording track. The signals outputted from the preceding reproducing heads or the signals outputted from the cross fader circuits to the recording heads is shifted every multiple recording tracks and inputted to the digital mixer and thus by means of monitoring the signals outputted to the recording heads by the speaker for monitor, the record information to be actually rewrote can be monitored.

17 Claims, 3 Drawing Sheets

APPARATUS FOR RECORDING AND REPRODUCING A DIGITAL SIGNAL TO PERFORM A TRACK BOUNCING EDITING OPERATION

BACKGROUND OF THE INVENTION

1. Field of the Invention

This invention relates to a recording and reproducing apparatus, and more particularly to an improvement of the recording and reproducing apparatus wherein information of multiple channels are adapted to be digital recorded on and reproduced from multiple recording tracks.

2. Description of the Prior Art

In such conventional recording and reproducing apparatus, there are apparatuses which are adapted to digital record music information of multiple channels from the recording heads corresponding to the recording tracks to be formed multiply in breadthwise of the magnetic tape.

As shown in FIG. 1, such recording and reproducing apparatus comprise a preceding reproducing head portion 3, reproducing heads for n channels, 3A, 3B, 3C . . . 3n of which are sequentially arranged in breadthwise of a magnetic tape 5 and a recording head portion 4, recording heads for n channels, 4A, 4B, 4C . . . 4n of which are sequentially arranged in breadthwise of the magnetic tape 5.

Accordingly, music information for multiple channels are digital recorded respectively on the magnetic tape 5 running to the direction as marked by an arrow a by each recording head 4A, 4B, 4C . . . 4n, of the recording head portion 4, and as a result, as shown in FIG. 2, recording tracks TR1, TR2, TR3 . . . TRn, for multiple channels are formed on the magnetic tape 5.

In such recording and reproducing apparatuses, there are some apparatuses which rewrite the information recorded on the first recording track to the second recording track, i.e., track bouncing processes, have been considered.

More specifically, FIG. 3 shows a recording and reproducing apparatus 1 for rewriting the record information of the first recording track on the magnetic tape 5, which are read out from the first preceding reproducing head 3A or 3B of the tape recorder 2, to the second recording track through the second recording head 4A or 4B and reproducing signal $S_{PBA}$ read out from the preceding reproducing head 3A is inputted to a delay circuit 7A and a switch circuit 8A.

The delay circuit 7A is adapted to output the reproducing signal $S_{PBA}$ read out from the preceding reproducing head 3A after delay for the prescribed time which is set for the time required for the magnetic tape 5 running from the position of preceding reproducing head 3A to the position of recording head 4A.

Accordingly, the reproducing signal $S_{PBA}$ read out from the preceding reproducing head 3A is inputted to the recording head 4A through the delay circuit 7A and the cross fader circuit 9A, and thus recorded on the same position in a longitudinal direction of the magnetic tape.

Also, the reproducing signal $S_{PBB}$ read out from the preceding reproducing head 3B is inputted to a delay circuit 7B and a switch circuit 8B.

The delay circuit 7B is adapted to output reproducing signal $S_{PBB}$ read out from the preceding reproducing head 3B after delaying for the prescribed time which is set for the time required for the magnetic tape running from the position of preceding reproducing head 3B to the position of recording head 4B.

Accordingly, as the reproducing signal $S_{PBB}$ read out from the preceding reproducing head 3B is inputted to the recording head 4B via the delay circuit 7B and the cross fader circuit 9B, and thus recorded on the same position in longitudinal direction of the magnetic tape 5.

At this point, the cross fader circuit 9A inputs the reproducing signal $S_{PBA}$ outputted from the delay circuit 7A or the signal inputted from the input terminal T3 upon shifting and outputs said signals inputted to the recording head 4A and the second input terminal NOR of the switch circuit 8A. The shifting operation of two input signals in the cross fader circuit 9A is adapted to shift gradually with the prescribed time constant.

Moreover, the cross fader circuit 9B inputs the reproducing signal $S_{PBB}$ outputted from the delay circuit 7B or the signals inputted from the input terminal T4 upon shifting and outputs said signals inputted to the recording head 4B and the second input terminal NOR of the switch circuit 8B. The shifting operation of two input signals of the cross fader circuit 9B will be conducted gradually with the prescribed time constant.

In this event, the switch circuit 8A inputs directly the reproducing signal $S_{PBA}$ outputted from the preceding reproducing head 3A to the first input terminal ADV, and simultaneously inputs the reproducing signal $S_{PBA}$ from the preceding reproducing head 3A to the second input terminal NOR via the delay circuit 7A and the cross fader circuit 9A.

Consequently, in the case where said switch circuit 8A is shifted to the first input terminal ADV side, the reproducing signal $S_{PBA}$ is outputted to the output terminal T1 at the timing that it is outputted from the preceding reproducing head 3A and simultaneously in the case where the switch circuit 8A is shifted to the second input terminal NOR side, the reproducing signal $S_{PBA}$ is outputted to the output terminal T1 at the timing that the reproducing signal $S_{PBA}$ outputted from the preceding reproducing head 3A is inputted to the recording head 4A.

Furthermore, the switch circuit 8B inputs directly the reproducing signal $S_{PBB}$ outputted from the preceding reproducing head 3B to the first input terminal ADV, and simultaneously inputs the reproducing signal $S_{PBB}$ from the preceding reproducing head 3B via the delay circuit 7B and the cross fader circuit 9B to the second input terminal NOR.

Thus, in the case where the switch circuit 8B is shifted to the first input terminal ADV side, the reproducing signal $S_{PBB}$ is outputted to the output terminal T2 at the timing that the reproducing signal $S_{PBB}$ is outputted from the preceding reproducing head 3B, and simultaneously in the case where the switch circuit 8B is shifted to the second input terminal NOR side, the reproducing signal $S_{PBB}$ is outputted to the output terminal T2 at the timing that the reproducing signal $S_{PBB}$ is outputted from the preceding reproducing head 3B to be inputted to the recording head 4B.

Moreover, the switch circuits 8A and 8B are to be shifted to the same input terminal side according to the switch signal $S_{CON}$ from the switch controlling circuit 10 respectively, and these can be shifted synchronously when the user conducts shifting operation of the switch circuit 10.

Moreover, the tape recorder 2 is connected to a digital mixer 6 and the reproducing signals $S_{PBA}$ and $S_{PBB}$ inputted to the digital mixer 6 via the output terminals T1 and T2 respectively are provided with the prescribed level adjustment and simultaneously being delay processed for the prescribed time in the delay circuit (not shown) placed in the digital mixer 6, are outputted to the input terminals T3 and T4 or the tape recorder 2 respectively.

Accordingly, the time after the reproducing signals $S_{PBA}$ and $S_{PBB}$ are inputted to the digital mixer 6 until the output signals $S_{PBA}$ and $S_{PBB}$ which are formed base on the reproducing signals $S_{PBA}$ and $S_{PBB}$ are outputted from the digital mixer 6, is arranged to be equal to those of each delay time of the delay circuits 7A and 7B of the tape recorder 2.

Moreover, a microphone input signal $S_{MIC}$ from the microphone MIC will be inputted to said digital mixer 6 and said microphone input signal $S_{MIC}$ can be added in the reproducing signals $S_{PBA}$ and $S_{PBB}$ respectively.

Moreover, said digital mixer 6 is able to monitor the reproducing signal $S_{PBA}$ or $S_{PBB}$ inputted and adapted to output the reproducing signal $S_{PBA}$ or $S_{PBB}$ to a speaker SP as monitor output signal $S_{MONI}$.

Thus, for example, in case of rewriting the information of first recording track which are tracked by the preceding reproducing head 3A and the recording head 4A respectively to the same time position (i.e., the same position in a longitudinal direction of the magnetic tape 5) of the second recording track which are traced by the preceding reproducing head 3B and the recording head 4B respectively, firstly by operating the switch controlling circuit 10 the switch circuits 8A and 8B are shifted to the first input terminal ADV side respectively and the reproducing signal $S_{PBA}$ outputted from the preceding reproducing head 3A is inputted to the cross fader circuit 9B via the digital mixer 6.

Moreover, the reproducing signal $S_{PBB}$ outputted from the preceding reproducing head 3B is inputted to the cross fader circuit 9B via the delay circuit 7B. Thus, the information of the same time position of the first recording track and the second recording track (i.e., the information of the first and second recording tracks which are placed on the same position in a longitudinal direction of the magnetic tape 5) are inputted to the cross fader circuit 9B respectively.

Accordingly, as the user shifts the cross fader circuit 9B at the prescribed timing, the information previously recorded on said recording track and the information recorded previously on the first recording track are recorded being shifted respectively on the second recording track to be recorded by the second recording head 4B.

Thus, in case of recording through the digital mixer 6, it is necessary to input the reproducing signal $S_{PBA}$ or $S_{PBB}$ early enough for delay time of said digital mixer 6 to thereof, and in this case, by shifting the switch circuits 8A and 8B to the first input terminal ADV side, the reproducing signal $S_{PBA}$ or $S_{PBB}$ outputted directly from the preceding reproducing head 3A or 3B (i.e., outputted without getting through the delay circuit 7A or 7B) will be inputted to the digital mixer 6.

However, in the recording and reproducing apparatus 1 which is adapted to perform the track bouncing recording by means of connecting the tape recorder 2 with the digital mixer 6, the switch circuits 8A and 8B are constantly shifted toward the same input terminal side. As a result, as described above in FIG. 3, in case of executing the track bouncing recording from the first recording track to the second recording track, the switch circuits 8A and 8B should be shifted toward the first input terminal ADV side.

As a result, the reproducing signals $S_{PBA}$ and $S_{PBB}$ inputted to the digital mixer 6 become all signals inputted directly from the preceding reproducing heads 3A and 3B. Accordingly, practically it has been difficult to monitor the signals to be recorded through the recording head 4A or 4B by the speaker SP since the signals outputted from the cross fader circuits 9A and 9B have not been inputted to the digital mixer 6.

SUMMARY OF THE INVENTION

In view of the foregoing, an object of this invention is to provide a recording and reproducing apparatus which is capable of monitoring the information to be recorded actually even in the case where the track bouncing is conducted via the digital mixer.

The foregoing objects and other objects of the invention have been achieved by the provision of a recording and reproducing apparatus 20 comprising a digital mixer 30 for inputting the signals $S_{PBA}$ and $S_{PBB}$ from the multiple preceding reproducing heads 3A and 3B corresponding to the multiple recording tracks TR1, TR2, . . . respectively and performing the prescribed signal processing and simultaneously outputting the signals inputted to the speaker SP for monitor, and cross fader circuits 9A and 9B for shifting the signals outputted from the digital mixer 30 or the signals outputted from the multiple preceding reproducing heads 3A and 3B and outputting to the recording heads 4A and 4B placed on the back of the preceding reproducing heads 3A and 3B, and for rewriting the information recorded on the first recording track TR1 of the recording medium 5 to the second recording track TR2; the signals $S_{PBA}$ and $S_{PBB}$ outputted from the preceding reproducing heads 3A and 3B or signals outputted from the cross fader circuits 9A and 9B to the recording heads 4A and 4B are shifted every multiple recording tracks and inputted to the digital mixer 30 and the signals outputted to the recording heads 4A and 4B are monitored by the speaker SP for monitor.

As the signals $S_{PBA}$ and $S_{PBB}$ outputted from the preceding reproducing heads 3A and 3B or the signals outputted from the cross fader circuits 9A and 9B to the recording heads 4A and 4B are shifted every multiple recording tracks and inputted to the digital mixer 30, the signals outputted actually to the recording heads 4A and 4B (i.e., the signals recorded on the second recording track TR2) can be selectable monitored.

Therefore, the user is able to monitor the information which have been actually rewrote.

According to the present invention, in the recording and reproducing apparatus which comprises a digital mixer for inputting signals from the multiple preceding reproducing heads corresponding to the multiple recording tracks respectively and performing the prescribed signal process and simultaneously outputting signals inputted to a speaker for monitor, and cross fader circuits for outputting the signals from said digital mixer or signals from the multiple preceding reproducing heads upon shifting, to the recording heads placed on the back of the preceding reproducing heads; and which is adapted to rewrite the information recorded on the first recording track of the recording medium to the second recording track; since signals outputted from the preceding reproducing heads or signals outputted from the cross fader circuits to the recording heads are shifted every multiple recording tracks and inputted to the digital mixer and signals outputted to the recording heads are monitored by the speaker for monitor, information actually rewrote can be monitored and accordingly, the recording reproducing device capable of improving further the usability can be obtained.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
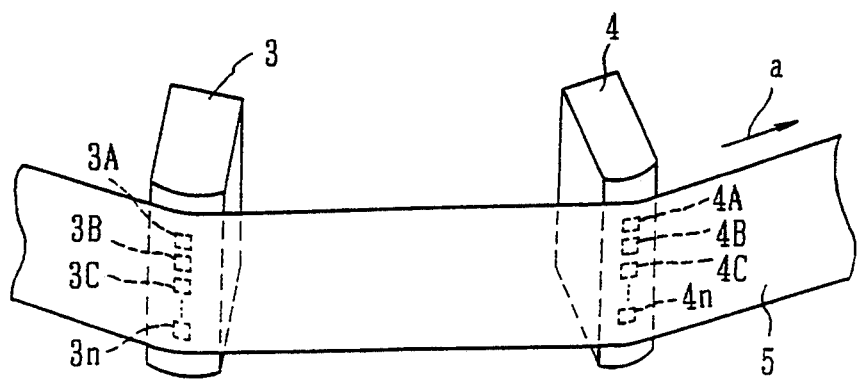
FIG. 1 is a diagrammatic perspective view showing the construction of the magnetic tape and the magnetic head.
Figure 2:
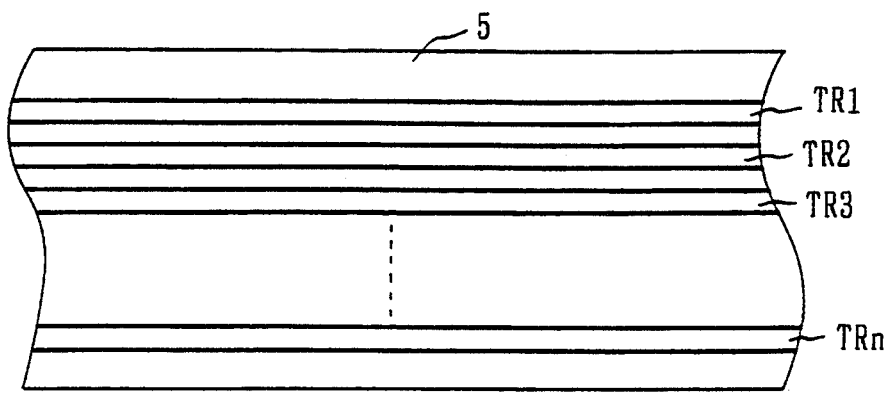
FIG. 2 is a schematic diagram showing multiple recording tracks formed on the magnetic tape.
Figure 3:
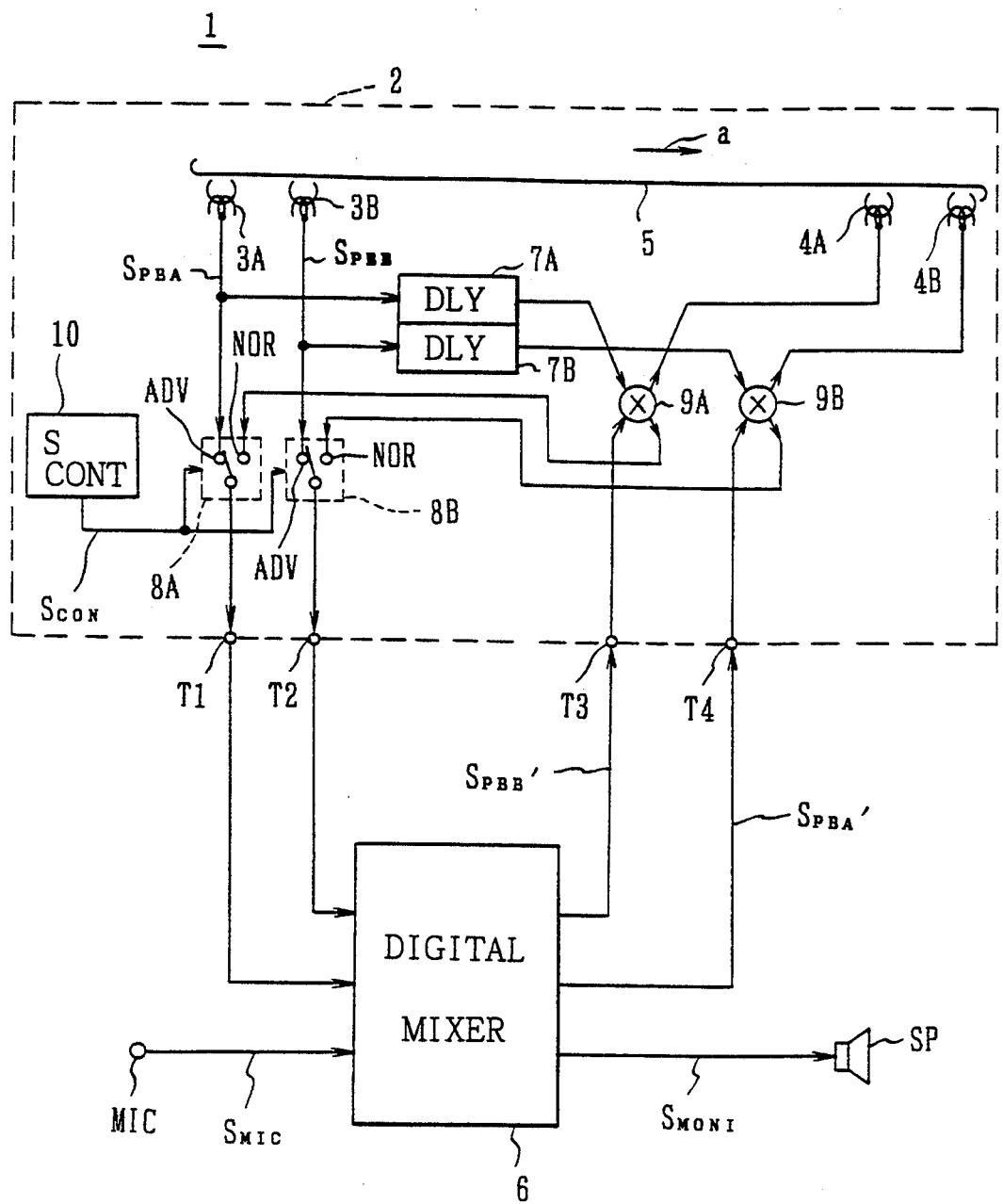
FIG. 3 is a connection diagram illustrating the conventional recording and reproducing apparatus.
Figure 4:
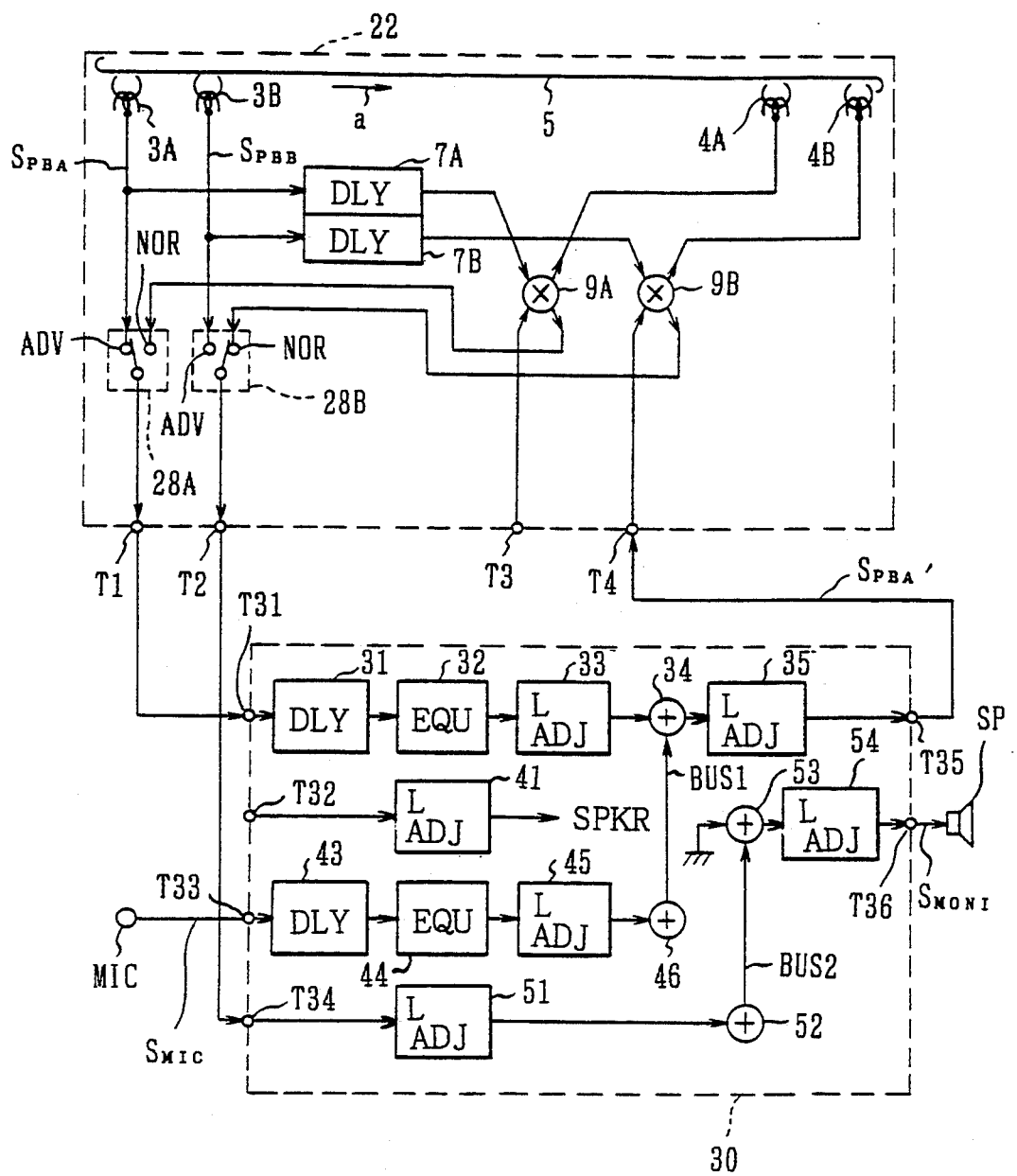
FIG. 4 is a connection diagram illustrating one embodiment of the recording and reproducing apparatus according to the present invention.

Preferred embodiments of this invention will be described with reference to the accompanying drawings:

In FIG. 4 wherein the identical reference numerals are given with the corresponding parts of FIG. 3, a recording and reproducing apparatus 20 comprises a tape recorder 22 and a digital mixer 30 which is connected to the tape recorder 22.

A switch circuit 28A in the tape recorder 22 inputs directly the reproducing signal $S_{PBA}$ outputted from the preceding reproducing head 3A to the first input terminal ADV side and simultaneously inputs the reproducing signal $S_{PBA}$ outputted through the delay circuit 7A and the cross fader circuit 9A to the second input terminal NOR side.

Moreover, the switch circuit 28B inputs directly the reproducing signal $S_{PBB}$ outputted from the preceding reproducing head 3B to the first input terminal ADV side and simultaneously inputs the reproducing signal $S_{PBB}$ outputted through the delay circuit 7B and the cross fader circuit 9B to the second input terminal NOR side.

At this point, since the switch circuits 28A and 28B are adapted to be able to perform shifting operation respectively, as shown in FIG. 4, the first switch circuit 28A is shifted to the first input terminal ADV side and simultaneously the second switch circuit 28B can be shifted to the second input terminal NOR side.

Moreover, after delaying signals inputted through an input terminal T31 for the prescribed time at the delay circuit 31, the digital mixer 30 performs the sound quality adjustment at an equalizer 32 and further performs the level adjustment at the following level adjusting circuit 33.

With this arrangement, the input signals which are adjusted to the prescribed sound quality and level are inputted to a level adjusting circuit 35 via a following adder 34 and further level adjusted and then outputted to an output terminal T35.

In this event, the delay time of the delay circuit 31 is set in order that the amount of time for signals inputted to the input terminal T31 till to be outputted to the output terminal T35 becomes equal to the running time of the magnetic tape which runs from the preceding reproducing head 3A to the recording head 4A.

Moreover, the digital mixer 30 is connected to an outside microphone MIC at the microphone input terminal T33 and inputs microphone input signal $S_{MIC}$ inputted via outside microphone MIC and simultaneously outputs this to the delay circuit 43. The delay circuit 43, after delaying for the same time as the delay circuit 31 as described above, performs the sound quality adjustment at the equalizer 44 and further performs level adjustment at the level adjusting circuit 45.

With this arrangement, the microphone input signal $S_{MIC}$ adjusted to the prescribed sound quality and level is outputted to a bus BUS1 through the adder 46 and is added to the signal outputted from the level adjusting circuit 33 at the adder 34.

Moreover, the digital mixer 30, after level adjusting the signal inputted to a monitor input terminal T34 through a level adjusting circuit 51, outputs to a bus BUS2 through an adder 52. The signal inputted to the bus BUS2 is inputted to a level adjusting circuit 54 through an adder 53 and after being conducted the prescribed level adjustment, is outputted to the speaker SP via the monitor output terminal T36 as monitor output signal $S_{MONI}$.

Furthermore, a second monitor input terminal T32 is placed in the digital mixer 30 and the signal inputted to the monitor input terminal T32 is outputted to the second speaker for monitor (not shown) via the level adjusting circuit 41.

According to the foregoing construction, in case of rewriting the information recorded on the first recording track which are traced by the preceding reproducing head 3A and the recording head 4A to the same time position of the second recording track (i.e., the same position in a longitudinal direction of the magnetic tape 5) which are traced by the preceding recording head 3B and the recording head 4B, the output terminal T1 of the tape recorder 22 is connected to the input terminal T31 of the digital mixer 30, and also the output terminal T2 of the tape recorder 22 is connected to the monitor input terminal T34 of the digital mixer 30 and furthermore, the output terminal T35 of the tape recorder 22.

Thus, in the recording and reproducing apparatus 20 connected as described above, the switch circuit 28A of the tape recorder 22 is shifted to the first input terminal ADV side and simultaneously the switch circuit 28B is shifted to the second input terminal NOR side. Accordingly, the reproducing signals $S_{PBA}$ outputted from the preceding reproducing head 3A is inputted directly to the input terminal T31 of the digital mixer 30.

Accordingly, the digital mixer 30 performs the prescribed sound quality adjustment and level adjustment on the reproducing signal $S_{PBA}$ inputted and simultaneously adds the microphone input signal $S_{MIC}$ from the outside microphone MIC as needed and outputs to the output terminal T35.

The reproducing signal $S_{PBA}$ outputted from the output terminal T35 is inputted to the second terminal of the cross fader circuit 9B via the input terminal T4 of the tape recorder 22. The reproducing signal $S_{PBB}$ outputted from the preceding reproducing head 3B is inputted to the first input terminal of the cross fader circuit 8B via the delay circuit 7B. Accordingly, by shifting said cross fader circuit 9B to the first input terminal side, the information on the second recording track outputted from the preceding reproducing head 3B is recorded on the same position of the second recording track via the recording head 4B and by shifting the cross fader circuit 9B to the second input terminal side, the information on the first recording track outputted via the digital mixer 30 after being outputted from the preceding reproducing head 3A is recorded on the same time position of the second recording track (i.e., the same position in a longitudinal direction of the magnetic tape 5) through the recording head 4B.

At this point, since the switch circuit 28B of the tape recorder 22 is shifted toward the second input terminal NOR side and the output from the second cross fader circuit 9B (that is the same signal as the signal recorded on the second recording track through the recording head 4B) is inputted to the monitor input terminal side T34 of the digital mixer 30, the information (music information) recorded on the second recording track via the recording head 4B is outputted from the speaker for monitor SP.

Accordingly, since the user can actually listen to the music recorded on the second recording track, whether the rewriting function from the first recording track to the second recording track is executed correctly or not can be confirmed with the real time.

According to the foregoing construction, as the shifting operations of the switch circuits 28A and 28B are performed respectively, in case of rewriting the recording information of the first recording track to the second recording track the information being rewrote actually can be monitored.

Accordingly, since the user can confirm the rewriting function constantly, the usability can be further improved.

The embodiment discussed above has dealt with the case of rewriting the first recording track and the second recording track. However, the number of recording tracks is not only limited to the above, but the present invention is also applicable to the recording and reproducing apparatus of multiple channels having various numbers of recording tracks. In this case, the circuit constructions of the preceding reproducing heads 3A and 3B, recording heads 4A and 4B, cross fader circuits 28A and 28B, and digital mixer 30 may be increased depending upon the number of recording tracks.

Moreover, the embodiment discussed above has dealt with the case wherein a signal inputted to the input terminal T31 and a signal inputted to the input terminal T33 are outputted from the output terminal T35, after adding by the adding circuit 34. The present invention is not, however, only limited to the above, but is also applicable to the case of outputting only a signal executed desired signal processing which is inputted to the input terminal T31.

The present invention is also applicable to the case wherein a reproducing signal from the other preceding reproducing head is selectively added and outputted from the output terminal T35, after executing desired signal processing.

Moreover, the embodiment discussed above has dealt with the case of rewriting the information of the first recording track to the second recording track. The present invention is not, however, only limited to the above, but is also applicable to the case of recording the information inputted by the external microphone MIC.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An apparatus for recording and reproducing a digital signal having a plurality of channel signals each respectively digitally recorded in one of a plurality of tracks on a recording medium, said apparatus comprising:

a plurality of reproducing means each associated with one of said tracks for respectively reproducing the channel signals recorded in the respective track;

a plurality of recording means each associated with one of said tracks for recording digital signals in the respective track;

processing means for processing received signals so as to generate therefrom a processed output signal and a monitor signal, said processing means including a line output terminal, said processed output signal being supplied to said line output terminal and said monitor signal being adapted for supply to monitor means for monitoring said monitor signal;

a first selector for selectively supplying the reproduced channel signals and said processed output signal from said line output terminal of said processing means for digital recording in at least a selected one of said tracks on said recording medium, said first selector including fader means with a fader element associated with each of said channel signals and having first and second output terminals, each of said first output terminals being respectively connected to the associated recording means; and a second selector including a plurality of switching means each having a respective one of the reproducing means and fader elements associated therewith, each of said switching means selectively supplying one of the channel signals reproduced by the associated reproducing means and the signal from the second output terminal of the associated fader element to said processing means, said selective supplying of each switching means being operated independently of the others.

2. An apparatus according to claim 1, wherein said processing means includes level adjusting means for adjusting the level of said received signals.

3. An apparatus according to claim 2, wherein said digital signal recorded on said recording medium is an audio signal and said processing means includes means for controlling a tone of at least one of said received signals.

4. An apparatus according to claim 3, wherein said monitor means includes a speaker.

5. An apparatus according to claim 1, further comprising delay means for delaying said reproduced channel signals and supplying the delayed channel signals to said first selector.

6. An apparatus according to claim 5, wherein said delay means delays said reproduced channel signals for a time period equal to the time in which said recording medium moves from a position where said reproducing means is located to a position where said recording means is located.

7. An apparatus according to claim 1, wherein each of said reproducing means includes a transducer.

8. An apparatus according to claim 1, wherein each of said recording means includes a transducer.

9. An apparatus according to claim 1, wherein said processing means includes at least one line input terminal associated with said channel signals and at least one monitor input terminal, and wherein said processing means processes a signal received by said monitor input terminal so as to generate said monitor signal for supply to said monitor means.

10. An apparatus according to claim 9, wherein each of said switching means is selectively connectable to said at least one monitor input terminal and said at least one line input terminal.

11. An apparatus according to claim 9, wherein said processing means further includes an external input terminal adapted to be connectable to a selected device for receiving a signal from said selected device.

12. An apparatus according to claim 1, wherein said processing means includes adding means for adding two of said received signals together for supply to said line output terminal.

13. An apparatus according to claim 1, wherein said processing means includes a mixer for processing said received signals and selectively mixing the processed received signals.

14. An apparatus for recording and reproducing a digital signal having a plurality of channel signals each respectively digitally recorded in one of a plurality of tracks on a recording medium, said apparatus comprising:
reproducing means including at least first and second reproducing heads for reproducing said channel signals recorded in first and second tracks, respectively;
recording means including at least first and second recording heads associated with said first and second tracks, respectively, for recording digital signals in said tracks;
processing means for processing the signal reproduced by said first reproducing head;
delay means for delaying the signal reproduced by said second reproducing head for a time period corresponding to a time in which said recording medium moves between a position where said reproducing means is located and a position where said recording means is located;
a selector for selectively supplying the signal delayed by said delay means and the signal processed by said processing means to said second recording head for digital recording in said second track on said recording medium;
monitor means for monitoring a received signal; and
means coupled to said selector for supplying said signal supplied to said second recording head by said selector to said monitor means.

15. An apparatus according to claim 14, wherein said selector includes fader means having a fader element.

16. An apparatus according to claim 14, wherein said processing means includes a plurality of input terminals and wherein said signal reproduced by said first reproducing head is supplied to one of said input terminals and said processing means processes the supplied signal from the one of said input terminals and selectively mixes the processed signal.

17. An apparatus for recording and reproducing a digital signal having a plurality of channel signals each respectively digitally recorded in one of a plurality of tracks on a recording medium, said apparatus comprising:
reproducing means including at least first and second reproducing heads for reproducing said channel signals recorded in first and second tracks, respectively;
recording means including at least first and second recording heads associated with said first and second tracks, respectively, for recording digital signals in said tracks;
processing means for processing the signal reproduced by said first reproducing head;
delay means for delaying the signal reproduced by said second reproducing head for a time period corresponding to a time in which said recording medium moves between a position where said reproducing means is located and a position where said recording means is located;
a selector for selectively supplying the signal delayed by said delay means and the signal processed by said processing means to said second recording head for digital recording in said second track on said recording medium;
monitor means for monitoring a received signal; and
supply means including first and second input terminals respectively connected to said second reproducing head and an output of said selector for selectively supplying therefrom signals received from said first and second input terminals, said supply means supplies said signal supplied to said second recording head to said monitor means upon selection of said second input terminal.

* * * * *